Jan. 13, 1953 W. F. LOOTENS 2,625,346

LEVEL WINDING MECHANISM

Filed Feb. 7, 1947

Inventor:
William F. Lootens,
by Merton D. Moore
His Attorney.

Patented Jan. 13, 1953 2,625,346

UNITED STATES PATENT OFFICE 2,625,346

LEVEL WINDING MECHANISM

William F. Lootens, Syracuse, N. Y., assignor to General Electric Company, a corporation of New York Application February 7, 1947, Serial No. 727,178

4 Claims. (Cl. 242—158)

Figure 1:
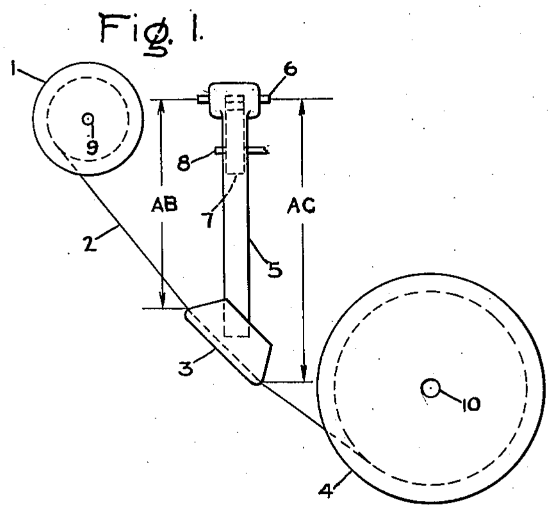

My invention relates to a level winding mechanism for use with a pair of reels or spools between which it is desired to pay an elongated strand or wire, the reels being of different widths.

An object of my invention is to provide an improved mechanism for level winding of a strand payed between spools of respectively different widths.

A more specific object of my invention is to provide a mechanism incorporating a wire guiding device, together with a pivoted lever member, which will serve to evenly unwind an elongated strand, wire, or the like from a supply spool of a predetermined width and so guide the wire that it will wind evenly upon a take-up spool of a different width.

While my invention is not limited thereto, it is particularly applicable to magnetic wire recording apparatus, and the following description and the drawing are directed to an embodiment of the invention comprising a portion of such apparatus.

Figure 3:
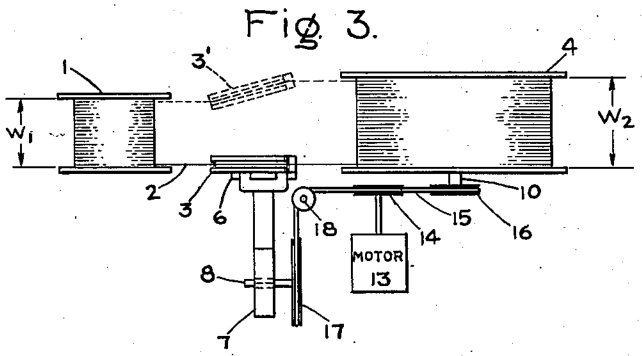
Figure 4:
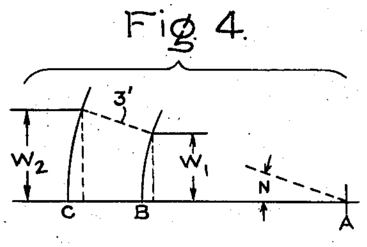

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which Fig. 1 is a side view and Fig. 2 an end view of a mechanism in accordance with my invention; Fig. 3 is a bottom view of the mechanism of Figs. 1 and 2 but including a view of a driving mechanism for the device; and Fig. 4 is a diagram exemplary of operation in accordance with the principles of my invention.

As shown in Fig. 1, the mechanism, according to my invention, comprises a supply spool 1 from the cylindrical winding surface of which a wire recording medium 2 is to be payed out or unwound so as to travel across a magnetic head 3 unto the winding surface of a take-up spool 4. The magnetic head 3 may comprise either a recording head, a reproducing head, an erase head, a combination head for recording and reproducing, or the like. In the preferred embodiment, the head comprises a combination electromagnetic reproducing, recording and erasing head. Hereinafter head 3 will be referred to as a magnetic head, or recording head, this terminology being intended to cover an electromagnetic or permanent magnet head for any one or more of the above functions. The recording head serves the function of a guide for the wire or strand in accord with my invention.

The head is mounted at the end of a lever 5 arranged to pivot about shaft or pivot 6 in accordance with the rotative position of heart shaped cam 7 mounted on shaft 8, as more completely described in connection with Fig. 2. Supply spool 1 is rotatable about an axially arranged shaft 9 and spool 4 is preferably arranged for driven rotation with axially disposed shaft 10. It will be noticed from Fig. 1 that the wire recording medium 2 is bowed slightly across head 3. Thus tension imposed on the medium through friction of spool 1 on shaft 9, or otherwise, tends to keep the medium in the wire-guiding groove or track provided in the head.

Figure 2:
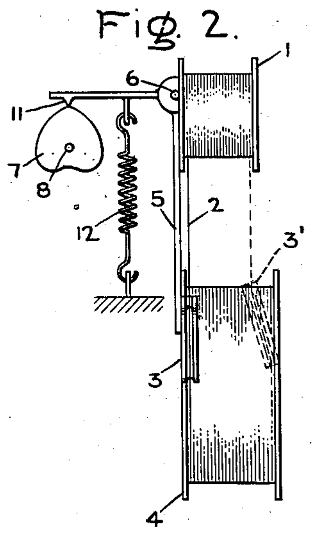

Referring now to Fig. 2, which is an end view taken from the left hand side of the device as shown in Fig. 1, recording head 3 is shown so aligned as to guide recording medium 2 in a substantially straight line, except for the slight bow mentioned above, from reel 1 to reel 4 at the left hand edges of the winding surfaces of the respective reels. In Fig. 2, the recording head is shown also in dotted lines at 3′ in the position in which the recording medium is unwound from supply spool 1 in a plane perpendicular to the axis of the spool adjacent the right hand side of the winding surface, diverted laterally by the guiding groove of the recording head, and supplied to take-up spool 4 in a plane perpendicular to the axis and adjacent the right hand edge of the winding surface thereof. Movement of the recording head, from the position shown in Fig. 2 in heavy lines, to the position 3′ in dotted lines, is accomplished by the rotation of heart shaped cam 7 by shaft 8 coacting with extended cam following portion 11 of lever 5. A suitable tension spring 12 is so arranged as to cause portion 11 to follow the surface of cam 7. Rotation of cam 7, from the position shown in Fig. 2, through 180° will pivot lever 5 about shaft 6 so as to move the recording head into the position 3′. Since the rotation of the cam is arranged to provide steady traverse of head 3 back and forth between the two predetermined positions, indicated by full and dotted lines respectively, the wire medium is unwound and wound evenly and smoothly from spool 1 to spool 4 across the whole winding surfaces of the respective spools. Reversing the direction of rotation of spools 1 and 4 permits even unwinding of the wire from spool 4 and even or level winding on spool 1.

Fig. 3 is a bottom view of the device of Figs. 1 and 2 showing spools 1 and 4, recording medium 2 and recording head 3 in a starting position for operation. The position of the recording head indicated in dotted lines in Fig. 2, wherein maximum deflection of the recording medium takes place, is also represented in Fig. 3 by a dotted line at 3' indicating the location of the guiding groove. Also shown in Fig. 3 is a suitable driving mechanism for spool 4 and cam 7. The driving mechanism comprises a motor 13 for driving a pulley 14 cooperating with a round continuous belt 15 for turning shaft 10 through pulley 16. Idler pulleys such as pulley 18 are provided as required to change the direction of or to guide belt 15. Spool 4 is mounted to rotate with driven shaft 10. In operation, motor 13 drives spool 4 to reel-in medium 2, the medium being thus drawn through the guiding groove of head 3, while the rotation of cam 7 imparts a pivoting motion of an oscillatory nature to lever 5 and head 3. Spool 1 is unwound by the reeling-in action of spool 4 on recording medium 2, though if desired, the supply spool may be separately driven in a known manner through a belt connection with motor 13. It is intended that driving means other than those shown may be employed without departing from the spirit or scope of this invention.

As shown in Figs. 2 and 3, spools 1 and 4 are of different widths, the widths in Fig. 3 being labelled $W_1$ for spool 1 and $W_2$ for spool 4. In order that the recording medium may be unwound evenly from spool 1 and wound evenly across the winding surface of spool 4, it is necessary that the end of head 3 adjacent spool 1 should traverse a distance equal to $W_1$ and that the end adjacent spool 4 should traverse a distance equal to $W_2$. This is accomplished in accordance with the invention by tilting the head 3 at an angle to pivot 5 as best shown in Fig. 1. The distance AB, from the end of the wire guiding groove adjacent spool 1 to pivot 6, is so related to the distance AC, from the end of the wire guiding groove adjacent spool 4 to pivot 6, that the lengths of the arcs described by the respective ends, as measured along perpendiculars from the starting position, differ in proportion to the difference in widths W1 and W2. Thus one end of the wire guiding groove of head 3 is made to traverse the whole width of spool 1 in a smooth and even manner while the other end of the groove is traversing the width of spool 4, providing level and even unwinding from spool 1 and level and even winding of the medium across the surface of spool 4.

In determining the degree of tilt of head 3 on lever 5, it will be found that the distances AB and AC, measured perpendicularly from pivot 6 to the ends of the wire guiding grooves, will be in the same ratio as the widths $W_1$ and $W_2$ of the spools. This may be understood from the relationship between the sides of a right triangle, wherein the tangent of an acute angle of the triangle is equal to the length of the opposite side divided by the length of the adjacent side. In accordance with this relationship, as best explained with reference to Fig. 4, when the lever is pivoted through an angle N, moving the head from one end of its traverse to the other, $\tan N = W_1/AB$ and $\tan N = W_2/AC$; thus $W_1/AB = W_2/AC$. Since $W_1$ and $W_2$ will be normally predetermined, the ratio of AB to AC is readily calculable.

While spools 1 and 4 are shown as having cylindrical winding surfaces of different diameters, as well as different widths, it will be apparent that my invention is equally applicable when spools of equal diameters are employed.

While I have shown only certain preferred embodiments of my invention by way of illustration, many modifications will occur to those skilled in the art and I therefore wish to have it understood that I intend, in the appended claims to cover all such modifications as fall within the true spirit and scope of my invention.

What I claim as new and desire to secure by Letters Patent of the United States is:

1. In combination, a pair of reeling spools mounted in side-by-side spaced relation for rotation about parallel axes and arranged to pay a strand from one to the other of said spools, the reeling portions for paying or receiving said strand being of respectively different widths for said two spools, an elongated guide for said strand disposed between said spools and pivotally supported for oscillation about another axis, said other axis being unequally spaced from said parallel axes, removed from the plane of said parallel axes, and having a direction substantially normal to the direction of said parallel axes, said guide having a guiding track at an angle to said other axis whereby the strand leaving said track is laterally displaced from the direction of the strand as it enters said track in accord with the pivotal positions of said guide.

2. A level winding mechanism for cooperation with a pair of rotatable spools from one to the other of which a strand may travel, said spools being of dissimilar widths, said mechanism comprising guiding means for said strand, a pivoted mounting arm positioned between said spools, said guiding means being disposed on said pivoted mounting arm and oriented thereon to displace said strand as it traverses said guiding means at a radial distance from the axis of said mounting arm, said said mounting arm axis and said guiding means normally being oriented substantially in a plane at right angles to the axes of rotation of said spools, the axis of said mounting arm being unequally spaced from said parallel axes, and having a direction normal to the direction of said parallel axes, and means for oscillating said arm about said mounting arm axis between two predetermined positions.

3. In combination, a pair of spools of respectively different widths arranged for rotation about spaced apart parallel axes, an elongated strand, said spools being arranged to pay said strand therebetween, a guide cooperating with said strand between said spools and having end portions from which said strand extends, a lever mounting said guide, a pivot axis for said lever remote from said guide said pivot axis being unequally spaced from said parallel axes and having a direction normal to the direction of said parallel axes, a rotatable cam for rocking said lever between predetermined positions, said guide being disposed with said end portions toward respective ones of said spools, the ratio between the perpendicular distances from said pivot to said respective end portions being substantially equal to the ratio between the respective spool widths, the end portion at the greater distance being toward the wider spool, and means for rotating said spools to pay said strand therebetween and for rotating said cam to level wind said strand.

4. The combination, in apparatus in which an elongated medium is unwound from one spool and wound onto another spool, of a pair of spools on which said medium is wound, said spools having respectively different widths and being mounted for rotation about respective parallel axes, elongated guiding means adapted for registry with said medium between said reels and pivotally mounted between said spools for oscillation about a pivotal axis located in a manner that during oscillation one end of said guiding means moves through a smaller arc than the other end of said guiding means, a cam means for oscillating said guiding means about said pivotal axis, motor means for driving said cam means, said guiding means having said one end disposed toward the narrower of said spools and said other end disposed toward the wider of said spools, the perpendicular distances from said pivotal axis to the respective ends of said guiding means being directly proportional to the widths of the respective spools toward which said ends are disposed.

WILLIAM F. LOOTENS.

REFERENCES CITED

The following references are of record in the file of this patent:

UNITED STATES PATENTS

| Number | Name | Date |
|---|---|---|
| 1,586,767 | Abbott | June 1, 1926 |
| 2,181,441 | Traphagen | Nov. 28, 1939 |
| 2,424,498 | Nygaard | July 22, 1947 |

FOREIGN PATENTS

| Number | Country | Date |
|---|---|---|
| 667,788 | France | Oct. 21, 1929 |